US012728532B2

(12) United States Patent
Cherian et al.

(10) Patent No.: US 12,728,532 B2
(45) Date of Patent: Sep. 8, 2026

(54) SYSTEM AND METHOD FOR OBJECT SEGMENTATION FOR TASK PERFORMANCE

(71) Applicant: Mitsubishi Electric Research Laboratories, Inc., Cambridge, MA (US)

(72) Inventors: Anoop Cherian, Acton, MA (US); Siddarth Jain, Cambridge, MA (US); Tim Marks, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 55 days.

(21) Appl. No.: 18/819,791

(22) Filed: Aug. 29, 2024

(65) Prior Publication Data

US 2026/0061610 A1 Mar. 5, 2026

(51) Int. Cl.

| | |
|---|---|
| ***B25J 9/16*** | (2006.01) |
| ***G06T 3/02*** | (2024.01) |
| ***G06T 7/11*** | (2017.01) |
| ***G06T 7/168*** | (2017.01) |
| ***G06T 7/70*** | (2017.01) |
| ***G06T 11/00*** | (2026.01) |

(52) U.S. Cl.

CPC ............... *B25J 9/1661* (2013.01); *G06T 3/02* (2024.01); *G06T 7/11* (2017.01); *G06T 7/168* (2017.01); *G06T 7/70* (2017.01); *G06T 11/00* (2013.01); *G06T 2207/20081* (2013.01); *G06T 2207/20084* (2013.01)

(58) Field of Classification Search

CPC .......... B25J 9/1661; G06T 7/11; G06T 7/168; G06T 7/70; G06T 3/02; G06T 11/00; G06T 2207/20081; G06T 2207/20084

See application file for complete search history.

(56) References Cited

U.S. PATENT DOCUMENTS

| | | | | |
|---|---|---|---|---|
| 11,961,281 B1 * | 4/2024 | Kim | ....................... | G06V 20/64 |
| 2023/0024736 A1 * | 1/2023 | Ogura | ....................... | G06T 7/70 |

OTHER PUBLICATIONS

Yun et al., "CutMix: Regularization Strategy to Train Strong Classifiers with Localizable Features." https://arxiv.org/pdf/1905.04899.pdf.

https://arxiv.org/pdf/1905.04899.pdf et al., "Segmenting Transparent Objects in the Wild." https://arxiv.org/pdf/2003.13948v3.pdf.

Kalra1 et al., "Deep Polarization Cues for Transparent Object Segmentation." CVPR 2020 , ieee xplore, open access. https://openaccess.thecvf.com/content_CVPR_2020/papers/Kalra_Deep_Polarization_Cues_for_Transparent_Object_Segmentation_CVPR_2020_paper.pdf.

* cited by examiner

*Primary Examiner* — Wade Miles
*Assistant Examiner* — Zachary Joseph Wallace
(74) *Attorney, Agent, or Firm* — Gene Vinokur

(57) ABSTRACT

Embodiments disclosing a controller for controlling a robot to perform a task are provided. The task is performed in an environment that is represented by an input image. The controller causes segmenting of an object in the input image. A confidence level of segmentation is updated by comparing the segmented object with constrained affined transformations of a template of the object. The constrained affine transformations are based on constraints indicative of a property of the object. The property of the object and the updated confidence level of segmentation are then used for performing the task.

20 Claims, 17 Drawing Sheets

608

Algorithm 1 TransMixup Algorithm

618 Require: $\mathscr{D} := \{(X_i, \mathscr{Y}_i)\}_{i=1}^{n}$ $\mathscr{D}' \leftarrow \mathscr{D}$ ▷ $\mathscr{D}'$ is our augmented dataset while $|\mathscr{D}'| < N$ do ▷ $N$ is the augmented size $(X, \mathscr{Y}) \sim \mathscr{D}, (X', \mathscr{Y}') \sim \mathscr{D}$ $K \sim [K_{max}]$ ▷ maximum number of augmentations for $k = 1 \rightarrow K$ do

620 $X_Y \leftarrow \text{crop}_Y(X[Y]), Y_Y \leftarrow \text{crop}_Y(Y[Y])$, for $Y \sim \mathscr{Y}$ 622 $(\tilde{X}_Y, \tilde{Y}_Y) \leftarrow (\mathbf{t}(X_Y), \mathbf{t}(Y_Y)), \mathbf{t} \sim \mathscr{T}$ 624 $(\tilde{X}, \tilde{Y}) \leftarrow (\text{paste}_z(\tilde{X}_Y), \text{paste}_z(\tilde{Y}_Y)), z \sim [H] \times [W]$ 626 $X' \leftarrow \text{blend}(X', \tilde{X}, \tilde{Y} | \alpha)$ for $\alpha \sim [0.5, 0.75]$ $\tilde{Y}[\tilde{Y}] \leftarrow |\mathscr{Y}'| + 1$ ▷ increment the instance id $\mathscr{Y}' \leftarrow \mathscr{Y}' \cup \{\tilde{Y}\}$ end for

$\mathscr{D}' \leftarrow \mathscr{D}' \cup \{(X', \mathscr{Y}')\}$

628 end while

FIG. 6C

SYSTEM AND METHOD FOR OBJECT SEGMENTATION FOR TASK PERFORMANCE

TECHNICAL FIELD

The present disclosure relates generally to object segmentation, and more specifically to object segmentation for performing a task by a robotic control system.

BACKGROUND

Object segmentation is a computer vision task that involves identifying and delineating the boundaries of objects within an image. Unlike semantic segmentation, which groups pixels into regions based on their semantic meaning (e.g., road, sky, person), object segmentation aims to separate individual object instances from each other.

One popular approach for object segmentation is Mask R-CNN (Region Convolutional Neural Network), an extension of the Faster R-CNN architecture. Mask R-CNN can detect objects in an image and generate a high-quality segmentation mask for each instance. This allows for precise object identification and localization. Other methods for object segmentation include U-Net©, which is commonly used for biomedical image segmentation, and DeepLab©, which employs convolution to capture multi-scale context in images.

However, object segmentation using any of the techniques mentioned above still has challenges. These challenges can be caused by the properties of the object to be segmented or the environment surrounding the object. For example, occlusions of the object and/or specific lighting conditions can negatively affect the segmentation especially if the segmentation is performed with the help of deep learning, which suffers from a shortage of training data. Similarly, the segmentation of transparent objects still causes a lot of uncertainties.

From small medicine bottles to the giant windowpanes of modern buildings, transparent objects are ubiquitous in our daily lives. Commonplace transparent items such as glasses, jars, and bottles—ubiquitous in both home and industrial settings—pose both challenges and opportunities for robotic manipulation. When deploying robotic agents to automate tasks, it is thus essential to ensure that these agents can perceive and operate on transparent and semi-transparent objects. Typically, the characteristics of transparent objects present significant challenges for robots in perception. For example, these objects often lack discernible surface features such as color and texture, relying heavily on the background of the image for visual distinction. Moreover, the reflective and refractive nature of transparent surfaces complicates the acquisition of precise depth data using depth sensors. Consequently, the collected data may prove invalid or contain unpredictable noise, thereby exacerbating the challenges associated with transparent object perception. This challenge may be complicated by shadows and the existence of non-transparent parts, as well as the overlap of transparent objects on top of each other, making the problem of instance segmentation of transparent objects particularly challenging.

Therefore, there is a need for improved methods of object segmentation in different task settings and more so in the case of tasks involving transparent objects.

SUMMARY

Different task settings may benefit from improved methods of object segmentation, which can overcome the challenges described above. One such task in a task setting is robotic bin picking, in which a robot is required to pick up instances of an object from a cluttered bin consisting of many object instances. This task occurs in both factory settings (e.g., for kitting, assembly, and packing) and home/business settings (e.g., picking a glass bottle from a box of bottles to serve juice, picking wine glasses from a dishwasher, and the like). The first step in solving the bin-picking problem is to segment the object instances from each other and the background to produce a set of instance candidates, which can be used in a grasp and motion planning pipeline for effectuating the pick. While many approaches to instance segmentation have been proposed, they typically assume in vague settings and very general contexts, and they operate mainly on opaque objects. Although there are extensions of these methods for transparent object segmentation, the problem of transparent instance segmentation (segmenting individual instances of the same object) has not received much attention in settings with limited training data.

Some embodiments are based on the understanding that the segmented image of a target object of interest can be compared with a template of a target object to evaluate the quality of segmentation. However, because there is an infinite number of image representations of any given object, such a comparison is impractical.

Some embodiments are based on an understanding that the segmentation is not always a stand-alone task, but a part of a workflow or a pipeline for performing a task. In these situations, the segmentation is performed for a downstream application that performs a task based on the segmentation. For example, the segmentation of individual transparent objects holds paramount importance across a spectrum of robotic applications. Transparent entities pervade our everyday lives, ranging from glass windows to plastic bottles, exerting notable influence within robotic operating environments. However, the unique characteristics of transparent objects present a significant hurdle for robots in perception. These objects often lack discernible surface features such as color and texture, relying heavily on the background of the image.

Hence, the segmentation of transparent objects in robotic manipulation applications assists a robot in performing a task. Examples of the task can be factory automation tasks such as picking plastic bottles from a bin or conveyor belts, or navigation applications controlling a robot or an autonomous vehicle to navigate around glass barriers for delivery and wheelchair assistance. Some embodiments are based on the realization that when the segmentation is performed for the downstream task that downstream task can assist the segmentation. In such a manner, it is an object of some embodiments to provide a constructive collaboration of the segmentation with the downstream task that assists both the segmentation and the performance of the task.

Some embodiments are based on the realization that such a constructive collaboration can be achieved by comparing a segmented object with the constrained affined transformation of an image template of the target object with constraints determined based on a property of the target object utilized by the downstream application. For example, in the context of object picking application, the property of the target object could be that the object is not covered, i.e., occluded, by the other object and/or positioned in a manner advantageous for its picking. In navigation applications, the properties of the object can be its proximity to the robot reflected in the size of the object in the image capturing the scene.

These properties can be transformed in the constraints for the constrained affined transformation. For example, the property of an object not covered by other objects can be transformed into a template of a non-occluded target object. The property of the pose of the object advantageous for picking can be transformed into the constraints limiting the types of the affine transformation. The property of proximity to the robot can be transformed into the size of a template of the target object and/or constraints on the type of the affine transformation shrinking the size of the object.

In such a manner, the segmentation is compared not with all possible types of segmentations represented by all possible types of affine transformations, but with the segmentations advantageous for downstream applications. Such a limited comparison reduces the computational burden of segmentation while increasing the confidence that the segmented object is advantageous or disadvantageous for the downstream application. In such a manner, the downstream application can select the segmentation based on confidence while implicitly considering the properties of the segmented object used by the downstream application thereby achieving the desired constructive collaboration.

Some embodiments are based on the usage of RGB or grayscale images of an object setting without the need for any other modality, thereby providing generalization to the implementation of methods and systems of the present disclosure.

Some embodiments are based on a recognition that segmentation of the object, specifically a transparent object can be performed using a Mask-RCNN backbone, but such an approach is computationally very expensive and time-consuming because of the requirement of a large corpus of training samples for training a neural network or a machine learning model using the Mask-R-CNN backbone. To that end, some embodiments disclose a few-shot learning methodology for training a neural network or a machine learning model for a task. For example, the task may be a robotic bin-picking task. The few-shot learning methodology disclosed in some embodiments does not require hundreds or thousands of annotated training images but is implemented using far fewer images. Thus, the embodiments disclosed herein provide computationally efficient and economic approaches to training a model for an underlying task based on the segmentation of objects in input images.

According to some embodiments, a robot for performing a task is provided. The robot comprises a processor that causes the robot to segment an object in an input image to produce a segmented object and a confidence level of segmentation. The robot is configured to update the confidence level of segmentation by comparing the segmented object with constrained affined transformations of a template of the object. The constrained affine transformations of the template of the object are based on a constraint limiting the affined transformations based on a property of the object. The robot is configured to perform the task based on the segmented object and the updated confidence level of the segmented object.

According to some embodiments, a controller for controlling a robot for performing a task is provided. The controller comprises a memory to store instructions and a processor configured to execute the instructions to cause the controller to perform operations, the operations comprising segmenting an object in an input image. The input image is indicative of an environment associated with the task. The operations further include updating a confidence level of segmentation by comparing the segmented object with constrained affined transformations of a template of the object with constraints indicative of a property of the object. The operations further include performing the task using the property of the object based on the updated confidence level of the segmented object.

According to some other embodiments, a non-transitory computer-readable medium is provided. The non-transitory computer-readable medium has stored thereon instructions that when executed by a computer, cause the computer to perform a method for controlling a robot for performing a task. The method includes segmenting an object in an input image. The method further includes updating a confidence level of segmentation by comparing the segmented object with constrained affined transformations of a template of the object. The constraints are indicative of a property of the object. The method further includes performing the task using the property of the object based on the updated confidence level of the segmented object.

BRIEF DESCRIPTION OF THE DRAWINGS

The presently disclosed embodiments will be further explained with reference to the following drawings. The drawings shown are not necessarily to scale, with emphasis instead generally being placed upon illustrating the principles of the presently disclosed embodiments.

FIG. 6A, FIG. 6B, and FIG. 6C collectively illustrates schematic diagrams showing the generation of synthetic training data by the controller, according to an embodiment of the present disclosure.

Figure 1:
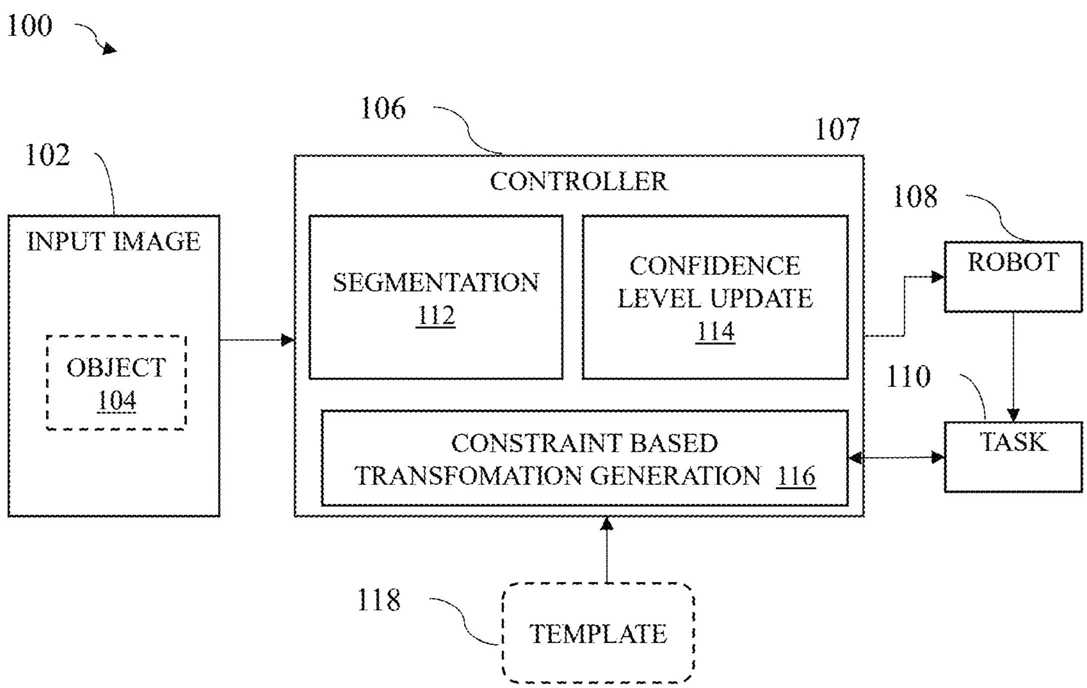
FIG. 1 illustrates a block diagram of a system for controlling a robot to perform a task, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art that fall within the scope and spirit of the principles of the presently disclosed embodiments.

DETAILED DESCRIPTION

The following description provides exemplary embodiments only and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as outlined in the appended claims.

Specific details are given in the following description to provide a thorough understanding of the embodiments. However, understood by one of the ordinary skills in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, reference numbers and designations in the various drawings may indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware, or microcode, the program code or code segments to perform the necessary tasks may be stored in a machine-readable medium. A processor(s) may perform the necessary tasks.

FIG. 1 illustrates a block diagram of a robot 108 operating in an environment 100 for performing a task 110, according to an embodiment of the present disclosure. The environment 100 may be any of a factory automation environment, a navigation environment, a bin picking environment, a medical environment, a restaurant, a kitchen, a home environment, a rescue and recovery environment, and the like. Accordingly, the task 110 may be any of a robotic bin-picking task, an assembly task, a navigation task, a search and recovery task, and the like. For example, in an application, the task 110 is robotic bin picking, in which a robot is required to pick up instances of an object from a cluttered bin consisting of many object instances. This task occurs in both factory settings (e.g., for kitting, assembly, and packing) and home/business settings (e.g., picking a glass bottle from a box of bottles to serve juice, or picking wine glasses from a dishwasher). The first step in solving the bin-picking problem is to segment the object instances from each other and the background to produce a set of instance candidates, which can be used in a grasp and motion planning pipeline for effectuating the pick. In some previous methods for performing the task of robotic bin picking task very general contexts are used for controlling a robot to perform such task, and that too mainly for opaque objects. Although there are extensions of these methods for transparent object segmentation, these methods suffer from the problem of limited training data and are thus not exactly accurate.

To solve this problem, the FIG. 1 illustrates a controller 106 for controlling the robot 108 to perform the task 110. The controller 106 comprises a memory to store instructions and a processor to execute the instructions to cause the controller 106 to perform operations for controlling the robot 108. The operations include segmenting an object 104 in an input image 102. The input image 102 may be received as a result of a computer vision operation. To that end, the input image 102 is any of a grayscale image or an RGB image.

The controller 106 includes a segmentation 112 module, which may be a block of code including instructions that are executable by the processor associated with the controller 106. The segmentation 112 module performs segmentation of the object in the input image 102. For example, the input image 102 is an image of a bin including many transparent bottles, and the object 104 is a particular transparent bottle of interest. In an embodiment, the segmentation 112 module uses a Mask-RCNN backbone for segmenting the object 104. The Mask-RCNN uses a few-shot learning-based fine-tuning methodology for segmenting the object 104. The few-shot learning methodology used by the segmentation 112 module is advantageous as compared to other methodologies that need hundreds or thousands of annotated training images, as the few-shot training methodology requires far fewer annotated images. To that end, some embodiments are based on a realization that when task 110 includes a robot bin picking task, and the input image 102 is the image of transparent objects, the controller 106 can leverage the inherent symmetry and rigidity of the transparent objects for performing segmentation of the object 104 using the segmentation 112 module.

In some embodiments, the segmentation 112 module uses a few-shot transparent instance segmentation method, which leverages training examples of annotated objects in two ways: i) by generating a potentially infinite synthetic training set (for training any deep learning instance segmentation backbone) using the approximate object model obtained from the instance annotations and ii) by filtering the instances predicted by the backbone by scoring their consistency with the object model.

To that end, the segmentation 112 module performs segmentation with several instances of objects overlapping and can identify each instance of the same underlying object class.

The controller 106 also includes a confidence level determination 114 module, which may be a block of code including instructions that are executable by the processor associated with the controller 106. The confidence level determination 112 module performs an update of a confidence level of segmentation by comparing the segmented object given by the segmentation 112 module with constrained affined transformations of a template 118 of the object 104. The constrained affine transformations of the template 118 are produced by a constraint-based transformation generation 116 module. A constraint for generating the constrained affine transformation is indicative of a property of the object 104 for performing the task 110. Affine transformations are a type of linear mapping method that preserves points, straight lines, and planes of the object being transformed. In simpler terms, they transform objects in a way that maintains the relative proportions and parallelism of lines. An affine transformation can be described using a combination of translation, scaling, rotation, shearing, and the like. Mathematically, an affine transformation is represented using a matrix and a vector. Affine transformations are useful because they preserve the "affine" properties of objects-such as ratios of distances and parallelism. The type of transformation required is determined by the constraint, which is indicative of a property of the object 104. The property of the object 104 in turn may be indicative of the downstream task 110 performed by the robot 108. For example, when the downstream task 110 is bin-picking, it would be advantageous to have the template 118 of the object 104 selected for an unoccluded object instance.

To that end, the property of the object 104 may include any of, but not limited to, one or a combination of a non-occlusion of the object by other objects, a pose of the object, and a distance to the object. For example, when the property of the object 104 is the non-occlusion of the object 104 by other objects, the template 118 of the object 104 includes only an image of a non-occluded object.

In another embodiment, the property of the object 104 is the pose of the object 104, and the constrained affine transformations are limited to transforming the template 118 of the object 104 into desired poses.

To that end, the template 118 of the object 104 is a representative of the object 104 that best matches the segmented object produced/predicted by the segmentation module 114. The template 118 may be an annotated instance mask in the given few-shot training images, which is unoccluded from other instances and thus forms a canonical representation of the underlying object 104. The template 118 may be manually selected from the annotated examples. The instance mask patches may be pre-stored during a training of the segmentation 112 module.

The template 118 is used to assign a confidence level to each segmented object proposal generated by the segmentation 112 module, for conformity with the template 118. The proposals that are most conformal are selected as high-quality segmentations. Those instances that are occluded, overlapped, or were falsely detected will naturally have a low conformity (are a bad match) with the template 118.

In an embodiment, the template 118 is selected based on conformity to the silhouette shape of the segmented object instance, as characterized by a set of annotated instance masks.

Some embodiments are based on a realization that there exist strong self-symmetries in the objects of interest such as glass bottles, glass jars, wineglasses, and the like. Specifically, many common transparent objects are long and thin with only a few resting poses when dropped into a bin, e.g., along their major axis (although they may occasionally have other pose variations). Considering these factors, the template 118 may be selected from a few (or even a single) annotation mask(s) of the object 104. These annotation masks may be available as part of training data or as pre-stored object templates in a library of templates stored in a memory or a database associated with the controller 106. The template 118 is then used based on a property of the object 104 and the constrained affine transformation of the template 118 to select the segmented object that conforms best with the template 118.

In another embodiment, the property of the object 104 is the distance to the object, and the affine transformations are limited to preserving the template 118 of the object 104 above a predetermined size.

The constrained-based transformation generation 116 module generates the constrained affine transform of the template 118 of the object 104. This constrained affine transform is then compared with the segmented object given by the segmentation 112 module. The comparison is performed by the confidence level determination 114 module, which updates the confidence level of the segmented object based on the comparison. It may be understood that at the start of operation of the controller 106, an initial confidence level may be assigned to the segmented object using the confidence score produced by a segmentation model such as Mask-RCNN. In the subsequent operation of the controller 106, this confidence level is updated by the confidence level determination 114 module.

Some embodiments are based on realizing that the constrained affined transformations can be performed by a neural network by selecting proper training data possessing the desired property. For example, the neural network can be trained using images of non-occluded objects or trained to transform the objects in the images into the desired poses, or about a predetermined size.

In an embodiment, the confidence level determination 114 module comprises an auxiliary spatial transformer neural network that predicts the affine transformation parameters of the object template model that are consistent with the instance predictions by the segmentation 112 module. This consistency has the additional advantage of inferring instance occlusions.

Once the confidence level of the segmentation is updated, the task 110 is performed using the property of the object 104 and the updated confidence level of the segmented object. For example, for the property of non-occlusion, using the image of a non-occluded object, a target object is identified from a bin, and subsequently picked from the bin, in the bin picking task.

Figure 2:
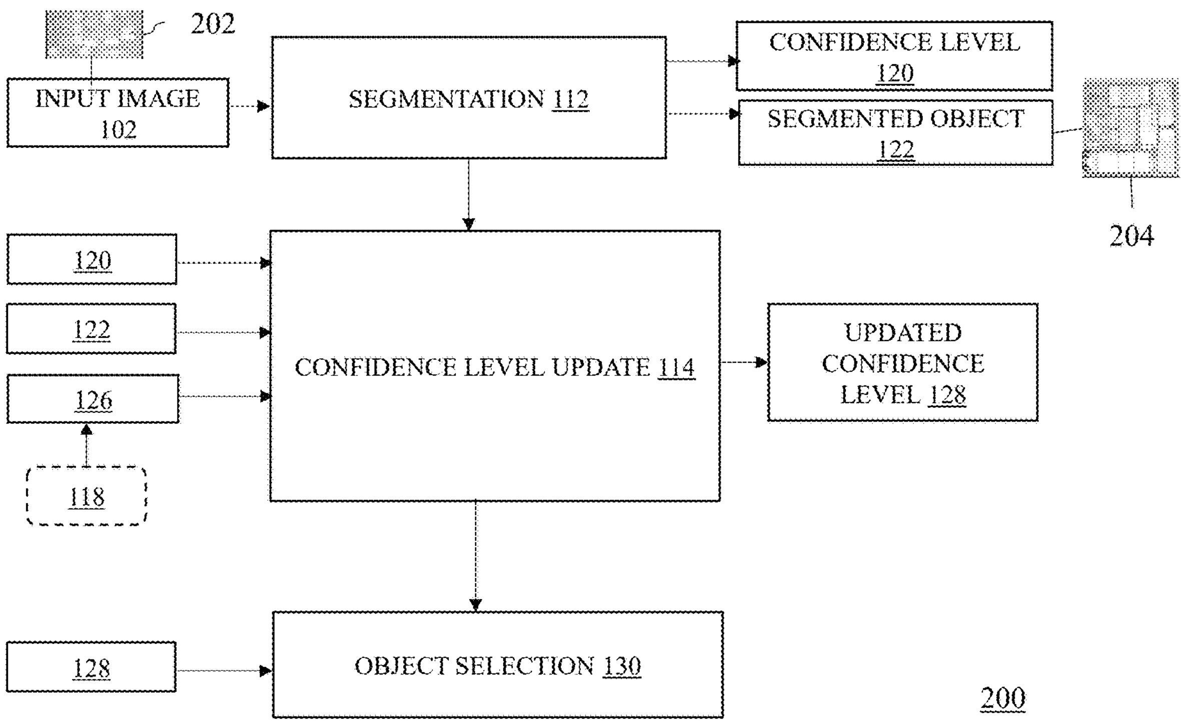
FIG. 2 illustrates a block diagram of a method performed by the controller for controlling the robot to perform the task, according to an embodiment of the present disclosure.

FIG. 2 illustrates a block diagram of a method 200 performed by the controller 106 for controlling the robot 108 to perform the task 110, according to an embodiment of the present disclosure.

In one embodiment, the method 200 is implemented by the controller 106, such as in the form of computer-executable instructions stored in the memory of the controller 106. The controller 106 may be in communication with or embodied within 108.

In one embodiment, the method 200 is implemented by the robot 108. To that end, the robot 108 comprises a processor that executes stored instructions to perform the steps of the method 200.

The method 200 begins with the segmentation 112 module receiving the input image 102 of the object 104. For example, the input image 102 may be a grayscale image 202 of a bin comprising multiple bottles. The segmentation 112 module provides as an output, a segmented object 122 and a confidence level of segmentation 120. The confidence level of segmentation 120 may be a numerical value indicating confidence in the segmented object. A higher value of the confidence level 120 indicates higher confidence in segmentation, implying better segmentation and overall better task performance. On the other hand, a lower value of the confidence level 120 indicates lower confidence in segmentation, implying poor segmentation and reduced task performance. For example, the confidence level 120 may be a numerical value between 0 and 1, such as 0.3, 0.4, 0.5, 0.8, and the like. A value of 0.3 may indicate low confidence, while a value of 0.8 may indicate high confidence. The segmented object 122 is part of a larger set of 204 different object segments that are differentiated using different bounding boxes, in an embodiment.

The segmented object 122 and its corresponding confidence level 120 are passed to the confidence level update 114 module which is configured to update the confidence level 120 of segmentation based on a constrained affine transformation 126 of the template 118 of the object 104. The constrained affine transformation 126 is generated by the constraint-based transformation generation 116 module shown in FIG. 1. As a result, the confidence level update 114 module generates an updated confidence level 128, which is used further in the step of object selection 130 which may be performed by a corresponding module, referred to hereinafter as the object selection 130 module.

In an embodiment, the updated confidence level 128 may be generated by a neural network. This is shown by an example in FIG. 3A.

Figure 3A:
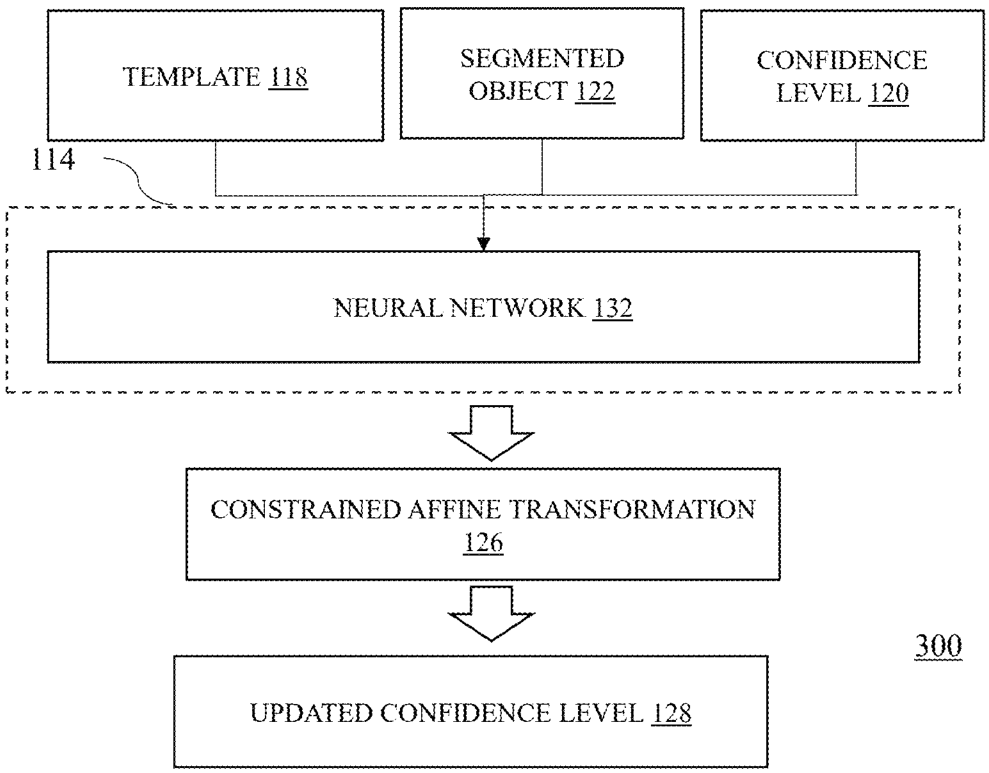
FIG. 3A illustrates a schematic of a neural network that may be trained to generate the updated confidence level, according to an embodiment of the present disclosure.

FIG. 3A illustrates a schematic 300 of a neural network 132 that may be trained to generate the updated confidence level 128 based on the constrained affine transformations 126 of the template 118 of the object 104, the segmented object 122, and the confidence level 120.

To that end, the neural network 132 may be embodied to be a part of or be in communication with the confidence level update 114 module. The neural network 132 may be trained on historical occurrences of the constrained affine transformations data of the template of the object, the segmented object data, and the confidence level data, to generate an updated confidence level. The neural network 132 may be executed at inference time based on the reception of the segmented object 122 as a trigger.

In an embodiment, the neural network 132 receives, as input, the segmented object 122, the confidence level 120, and the template 118 of the object 104. To that end, the confidence level 120 may be a confidence score that is generated by the segmentation 112. For example, if the segmentation 112 module comprises a Mask-RCNN model, then the confidence level 120 is the confidence score of segmentation, as provided by the Mask-RCNN model.

In an embodiment, the neural network 132 derives based on: the template 118, the segmented object 122, and the confidence level 120, parameters of the constrained affine transformation 126 for the template 118. These parameters are then used to check the conformance of the segmented object 122 with the template 118, and the neural network 132 then generates the updated confidence level 128 based on the results of this conformance check.

Figure 3B:
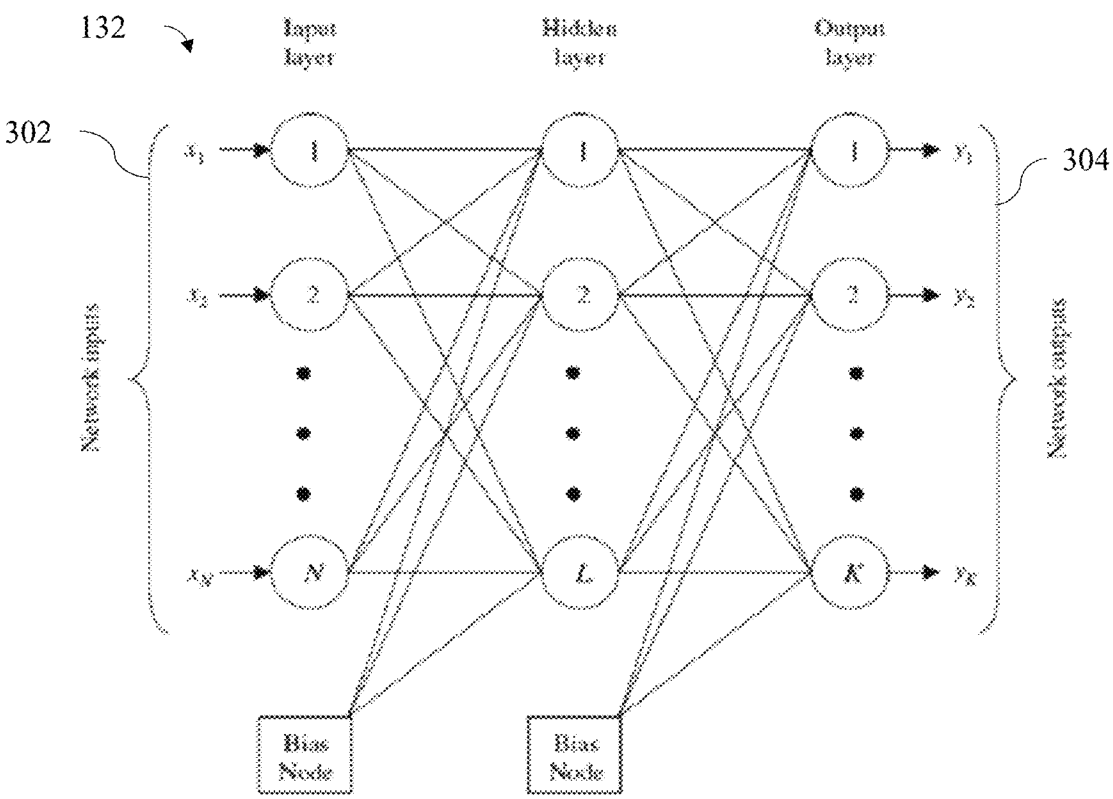
FIG. 3B illustrates a schematic diagram of the neural network of FIG. 3A, according to some embodiments of the present disclosure.

FIG. 3B illustrates a schematic diagram of the neural network 132, according to some embodiments of the present disclosure. The neural network 132 may be a network or circuit of an artificial neural network, composed of artificial neurons or nodes. Thus, the neural network 132 is an artificial neural network used for solving artificial intelligence (AI) problems. The connections of biological neurons are modeled in the artificial neural networks as weights between nodes. A positive weight reflects an excitatory connection, while a negative weight value means inhibitory connections. All inputs 302 of the neural network 132 may be modified by weight and summed. Such an activity is referred to as a linear combination. Finally, an activation function controls the amplitude of an output 304 of the neural network 132. For example, an acceptable range of the output 304 is usually between 0 and 1, or it could be −1 and 1. The artificial networks may be used for predictive modeling, adaptive control, and applications where they may be trained via a training dataset. Self-learning resulting from experience may occur within networks, which may derive conclusions from a complex and seemingly unrelated set of information.

Referring back to FIG. 2, at inference time, the neural network 132 generates the updated confidence level 128, which is used by the object selection 130 module.

In an embodiment, the object selection 130 module may be embodied with the confidence level update 114 module, however, it is shown separately in FIG. 2 for ease of description. The object selection 130 module compares the updated confidence level 128 with a confidence level threshold and based on the comparison performs the task 110. The operation of the controller 106 to control the robot 108 to perform the task 110 using the modules described above is illustrated by a block diagram of FIG. 4A.

Figure 4A:
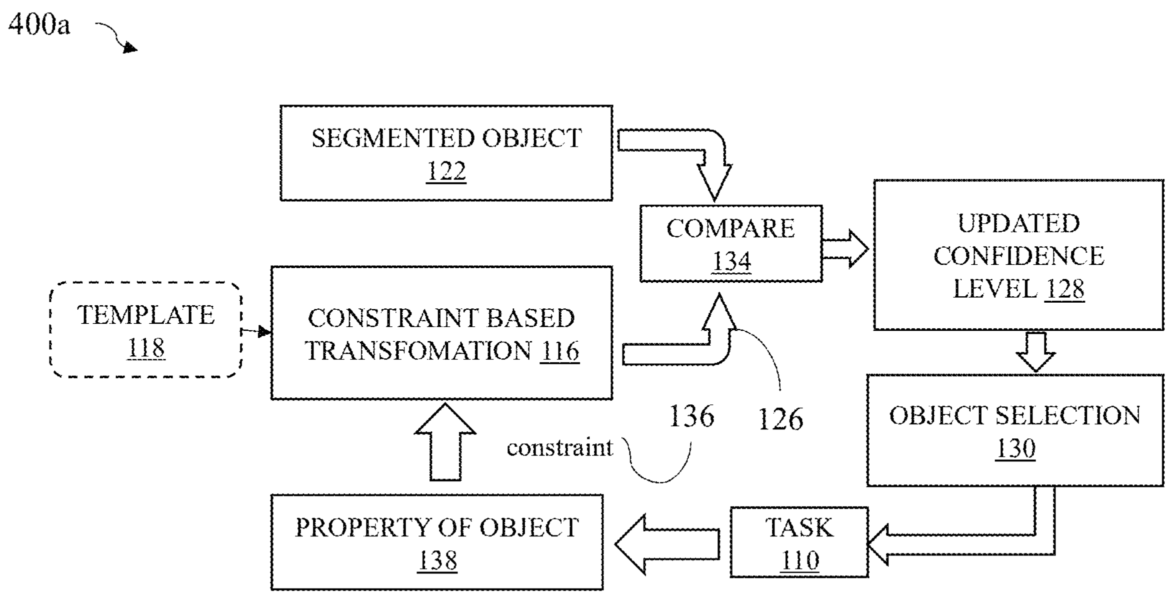
FIG. 4A illustrates a block diagram of a method for performing object selection to perform the task, according to an embodiment of the present disclosure.

FIG. 4A illustrates a block diagram of a method **400*a* for performing object selection to perform the task 110, according to an embodiment of the present disclosure. FIG. 4A is described in conjunction with elements from FIG. 2 and FIG. 3A. In an embodiment, the confidence level update 114 module is configured to compare 134 the segmented object 122 and the constrained affine transformation 126 of the template 118 of the object 104 generated by the constraint-based transformation generation 116 module to give the updated confidence level 128 of the segmented object 122 (also referred to as the updated confidence level of segmentation). The updated confidence level 128 of the segmented object 122 is then used by the object selection 130 module to perform the task 110 by selecting the segmented object 122 with the highest confidence level among a set of segmented objects. This is described in FIG. 4**B.

The updated confidence level 128 of the segmented object 122 is produced based on the constrained affine transformation 126 of the template 118 of the object 104, as defined by a constraint 136. The constraint 136 is identified based on a property 138 of the object 104 and is dependent on the downstream task 110 performed by the robot 108. For example, the property 138 may be one or a combination of non-occlusion of the object 104 by other objects, pose of the object 104, distance to the object 104, and the like.

In some embodiments, the property 138 of the object is used for performing the task 110. For example, the property of non-occlusion of the object 104 causes the constraint 136 to be specified in terms of selecting and/or transforming the template 118 of only non-occluded objects. This template 118 is then compared with the segmented object 122 and based on the conformance of the segmented object 122 with template 118, the non-occluded object is selected for the task 110. For example, the task 110 is picking the object 104, so the non-occluded object 104 is then picked up by the robot 108.

Figure 4B:
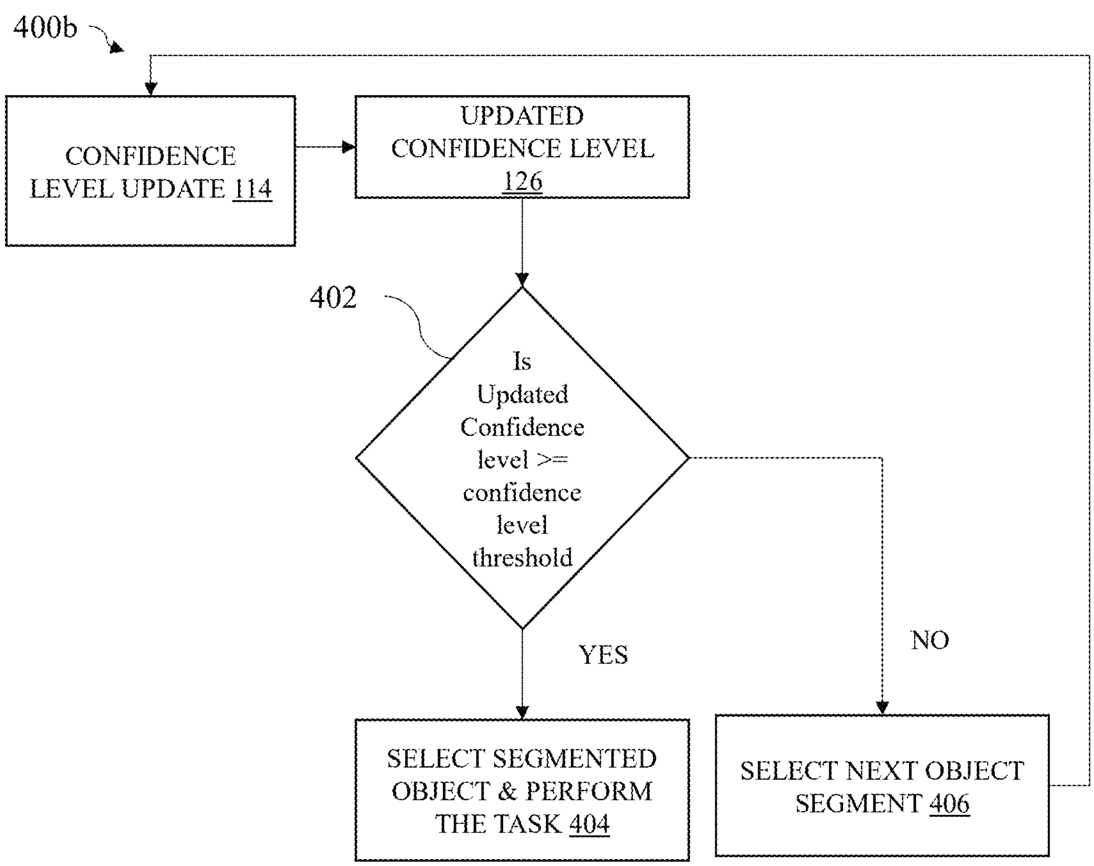
FIG. 4B illustrates a block diagram of a method for the selection of an object segment for performing the task, according to an embodiment of the present disclosure.

Thus, using the updated confidence level 128, the controller 106 performs the object selection 130 based on a method described in FIG. 4B.

FIG. 4B illustrates a block diagram of a method 400*b* for the selection of an object segment for performing the task 110. The updated confidence level 126 of the segmented object 122 is compared to 402 with a confidence level threshold. The confidence level threshold may be set according to the task 110. In critical tasks, the confidence level threshold may be set high, for example at a value of 0.8 for a range of confidence levels between 0 and 1. In non-critical tasks, the confidence level threshold may be set to an optimum value, for example at a value of 0.6 for the range of confidence level between 0 and 1.

If, after the comparison 402, it is determined that the updated confidence level 126 is greater than or equal to the confidence level threshold, then at 404, the segmented object 122 is selected and the task 110 is performed using the segmented object 122.

However, if the comparison 402 leads to a determination that indicates that the updated confidence level 126 is lesser than the confidence level threshold, then at 406, a next segmented object may be selected. For example, the segmentation 112 module may pick another object from the input image 102 and generate the next segmented object from the input image 102.

In an embodiment, the method 400*b* is executed iteratively till a segmented object with the highest confidence level is obtained, and subsequently the task 110 is performed based on this segmented object with the highest confidence level.

In an embodiment, the segmented object 122 is produced by the segmentation 112 module which comprises a Mask-RCNN backbone.

Figure 5A:
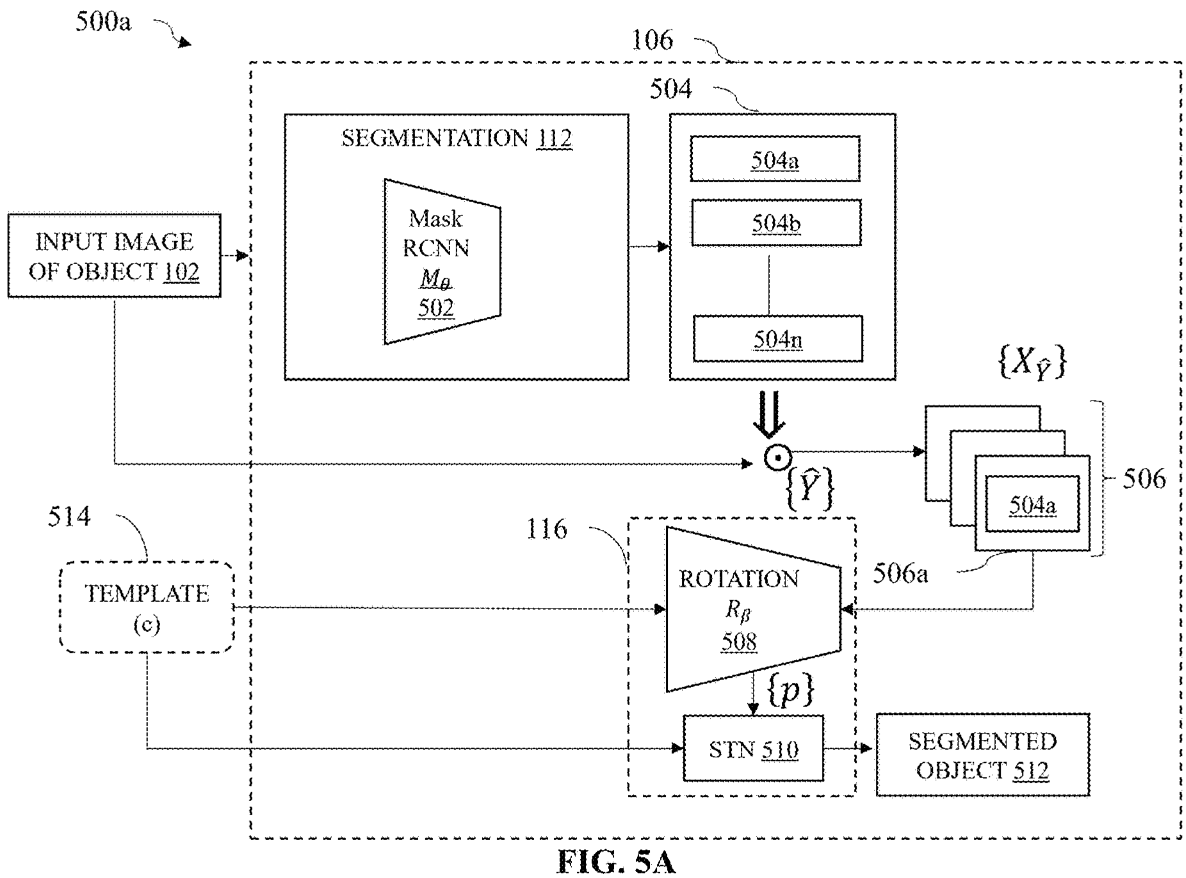
FIG. 5A illustrates a block diagram of an example implementation of the controller based on a Mask-RCNN backbone, according to an embodiment of the present disclosure.

FIG. 5A illustrates a block diagram 500*a* of an example implementation of the controller 106 based on a Mask-RCNN backbone 502, according to an embodiment of the present disclosure.

In the example embodiment shown in FIG. 5A, the controller 106 includes the segmentation 112 module which comprises a Mask-RCNN 502 backbone denoted as $M_\theta$.

Conventionally, Mask-RCNN is built over a Faster-RCNN backbone which first produces object proposals in the form of instance bounding boxes, these are then scored to select boxes of high confidence, which are used to produce mask segmentations using a deep convolutional segmentation head. While the quality of the segmentations produced by the Mask-RCNN may be high, these scores may not strongly correlate to the quality metrics useful for a downstream task, such as robotic grasping. For example, in the case of overlapping instances, while Mask-RCNN can produce segmentation masks of high confidence for instances that are overlapped by other instances, these instances underneath might not be useful when deciding which instances to grasp in a bin-picking application. Another common issue with conventional Mask-RCNN is that it produces false positives in regions where there are no instances at all, for example, due to specular reflections off the bin. However, the controller 106 disclosed herein uses a refined architecture based on the Mask-RCNN 502 backbone, which produces refined predictions for object instances or segmented objects by filtering the initial predictions produced by the Mask-RCNN 502 backbone. The filtering is done based on the scoring of each prediction produced by the Mask-RCNN 502 backbone for conformity with a template object. As was disclosed previously, template objects are representative models of underlying objects of interest.

To that end, suppose X denotes an RGB or grayscale input image 102 of height H and width W, containing multiple instances of an object O, which is the same as the object 104 referred to in FIG. 1. Let $\mathcal{Y}=\{Y_1, Y_2, \ldots, Y_{\#(X)}\}$ be the set of instance masks for all the instances in X-one for each instance, where #(X) indicates the total number of instances in X. Assuming that the masks Y are of the same spatial dimensions as the image X but containing zeros everywhere except at pixel locations overlapping with the corresponding instance in the image, where the mask takes a constant numeric value identifying the instance. This instance identifier is unique across the masks in Y. Further, let $$\mathcal{D}=\{(X_i, \mathcal{Y}_i)\}_{i=1}^{n}$$

denote the few-shot training set consisting of n such pairs of an image and all of its instance annotation masks. It may be assumed that all the instances in a given image are annotated and the total number of annotated instances in $\mathcal{D}$ is small. For example, in a Medical Bottle object class, the number of training images may be about 10, and each image may have 1-5 annotated instances.

In some embodiments, the Mask-RCNN 502 backbone is denoted as $M_\theta$, which is a deep learning model, is trained on parameters θ that can take as input an image X and predict instance segmentation masks 504, having different segmented objects, such as a segmented object 504*a*, a segmented object 504*b*, and a segmented object 504*n*, similar to those in the ground truth $\mathcal{Y}$. Further, the prediction is refined subsequently based on a comparison of the confidence level of each of the predicted instance segmentation masks 504 with a confidence level threshold.

In some embodiments, the Mask-RCNN 502 backbone is denoted as $M_\theta$ is pre-trained. If, during its pre-training, this backbone has not seen the transparent objects that are used at inference, then such zero-shot transfer of the backbone model $M_\theta$ is prone to errors, especially when dealing with transparent objects. A naive approach to adapt the backbone to the given data setting is to fine-tune the parameters θ on the images in $\mathcal{D}$, but given only a few annotated images, the training can be ineffective. To that end, the controller 106 may cause the production of a larger training set from the few-shot examples, where this additional training data spans the space of the object appearances more densely, that could lead to better training of the Mask-RCNN 502 backbone model. This production of a larger training set is explained later in conjunction with FIG. 6A, FIG. 6B, and FIG. 6C.

To that end, the controller 106 receives the input image 102, X, and produces the instance segmentation masks 504 using the segmentation 112 module, which includes the Mask-RCNN 502 backbone $M_\theta$. For example, the instance segmentation masks 504 comprise $\mathcal{Y}=\{Y_1, Y_2, \ldots, Y_{\#(X)}\}$, the set of instance masks for all the instances in X. The controller 106 causes the input image 102 to be cropped on the bounding boxes of the predictions of the segmentation masks 504 produced by the Mask-RCNN 502 backbone to generate cropped image patches 506. Each cropped image from the cropped image patches 506 may correspond to a segmented object predicted by the Mask-CNN 502 backbone. For example, a cropped image patch 506*a* corresponds to the segmented object 504*a*. Similarly, cropped image patches corresponding to other segmented objects like the segmented object 504*b*, the segmented object 504*n*, and the like may be generated, but are not shown in FIG. 5A for the sake of brevity of description.

The cropped image patches 506 are then passed to a new rotation prediction network 508 that selects a template 514 (which may be equivalent to the template 118 shown in FIG. 1) among model templates and predicts the spatial pose, p, (angles) of the instance in the cropped image patch 506*a* from the image patches 506 in relation to the template 514. When this pose, p, is used to transform the instance mask template 514, such as using a spatial transformer network (STN) 510, it should produce the instance mask that the Mask-RCNN 502 backbone generated. In an example, the predicted instance mask for the segmented object 504*a* may be represented by the segmented object 512.

The conformance of the predicted template mask and the Mask-RCNN 502 helps to decide the quality of the Mask-RCNN's 502 predictions, as well as the possibility that the instance has undergone occlusions, overlaps, the latter comes directly from the fact that the template masks are assumed to come from non-occluded instances.

In some embodiments, the set of such templates is denoted as $\mathcal{C}$, where each template $c \in \mathcal{C}$ is a cropped and centered annotated instance patch. To produce the pose of the instance in a proposal image patch, a template rotation predictor neural network 508, $R_\beta: \mathbb{R}^{h \times w \times c} \rightarrow [-\pi, \pi]^k$ k is trained with trainable parameters β, where this network $R_\beta$ takes as input the image patch cropped around the proposal instance—with c color channels and resized to spatial size h×w—and produces as output the k rotation angles of the template 514.

In some embodiments, $\hat{Y}$ is an instance mask produced by the Mask-RCNN 502 for an input image X and if $X_{\hat{Y}}$ is the corresponding image patch cropped around $\hat{Y}$ (using the notation described in the last section), then a training objective for the template rotation predictor neural network 508 R is given by:

$$\min_\beta \mathbb{E}_{(X,\mathcal{Y})\sim D'} \mathbb{E}_{Y\sim \mathcal{Y}} \| t_{rot}(c; p) - Y_Y \|_1, \text{ where } p = R_\beta(X_Y) \quad \text{Eq. (1)}$$

and $t_{rot}$ (c; p) denotes the spatial rotation of the template 514 *c* by angles in p. When selecting the data for training using Eq. (1), it may be assumed that the masks Y are taken from augmented dataset and are selected to have no other instance on top of the selected instances in the depth order so that it may be ensured that occluded instances are not used during training.

In an embodiment, R is implemented as the STN 510, and the template 514 *c* is a pixel mask of an instance. Once the model R is trained, for a given test image patch $X_{\hat{Y}}$ from the predicted mask $\hat{Y}$, a quality score for the predicted mask with respect to the template 514 *c* is calculated using intersection-over-union (IoU) as:

$$\text{score}_c(X_{\hat{Y}}) = IoU(t_{rot}(c; R_\beta(X_{\hat{Y}})), \hat{Y}_{\hat{Y}}) \quad \text{Eq. (2)}$$

To that end, the test image patch corresponds to the cropped image patch 506*a* of the segmented object 504*a* predicted by the Mask-RCNN 502 in an embodiment.

A higher score suggests better conformance between the transformed template and the predicted mask. Further, predicting the poses p using a separate network R makes the filtering process robust to biases in scoring (e.g., by the backbone). An instance prediction is finally selected, as the segmented object 512, using a combination of the template-based score given in Eq. (2) and a Mask-RCNN score, $\text{score}_M$. It may be understood that $\text{score}_M$ is inherently given by the Mask-RCNN 502 backbone. For example, the Mask-RCNN may use one or a combination of scores such as an object classification score, a bounding box regression score, a mask prediction score, and the like. The overall Mask-RCNN score, $\text{score}_M$, may be given as combination of these different scores using operations such as thresholding, non-maximum suppression (NMS), average prediction (AP), mean average prediction (mAP) and the like.

The $\text{score}_M$ and the $\text{score}_c$ may be combined using, for example, a relation:

$$(\text{score}_c > \eta_c) \wedge (\text{score}_M > \eta_M) \text{ using thresholds } \eta_c, \eta_M > 0.$$

In an embodiment, referring back to FIG. 1, the template-based score, $\text{score}_c$, may be the updated confidence level 128 is determined by the confidence level update 114 module. In that manner, the confidence level 120 may correspond to the $\text{score}_M$, and the segmented object 122 may correspond to the segmented object 504*a*. Further, the object selection 130 module may provide the segmented object 512 as output for task 110 performance, based on a comparison of the $\text{score}_c$ with the confidence level threshold $\eta_c$.

In an embodiment, the controller 106 takes as input, real-world images corresponding to a dataset consisting of seven categories of bottles in a bin setting taken using a downward-facing camera directly into the bin. The object categories are: (i) Small Bottle, (ii) Large Bottle, (iii) Mayo Bottle, (iv) Pet Bottle, (v) Medical Bottle, (vi) Sauce Bottle, and (vii) Soy Bottle—all the categories constitute everyday objects. Each category varies in object shape, transparency, size, and the number of instances in the bin. For example, 20 images per category are collected and all instances are annotated manually. Each image consists of 1-10 instances for each category except Soy Bottle, which has up to 50 instances in an image.

For training, a pre-trained Mask-RCNN 502 model based on the ResNet-50 backbone that was trained on the MS-COCO dataset is used. The mask and the box prediction heads of the Mask-RCNN 502 were replaced with randomly initialized layers. In an example, 10 annotated images were used for training/validation and the remaining 10 for testing; all the training images had less than 5 instances per image, while the test set images had 5-10 instances. For example, less than 25 annotated instances for training were used in total.

In an embodiment, a maximum of 5 synthetic instances per image were generated. The generation of synthetic images is explained in conjunction with FIG. 6A, FIG. 6B, and FIG. 6C. For fine-tuning the Mask-RCNN 502, the entire training used new instances, and thus the augmented data size N=batch size×number of training iterations was used. It was reported that each training iteration took about 3 seconds (on an NVIDIA 3090 GPU) with a synthetic batch size of 32, and the Mask-RCNN 502 model was trained for about 640 iterations when the performance was seen to saturate on the validation set.

In an embodiment, during a second phase of operation of the controller 106 in prediction filtering, the Mask-RCNN 502 was trained using the augmented dataset and using a fixed object template produced from the original training images. In an example, a ResNet-18 pre-trained model (trained on ImageNet) was used as the backbone, where the last layer was replaced to predict a scalar angle for the template pose. Training this module took 2.5 seconds per iteration and was trained for about 1600 iterations. In an embodiment, the controller 106 as trained and evaluated using the datasets described above shows high computational efficiency for segmenting objects, even if available training data is less. This is advantageous in tasks and applications where the availability of sufficient training data is challenging. For example, one such task is a robotic bin-picking task for transparent objects.

Also, the controller 106 provides improved generalization and applicability in real-world robotic applications, by providing a few-shot model that is tailored to transparent instance segmentation. Few-shot segmentation holds particular importance for transparent objects due to their unique optical properties and the scarcity of suitable labeled datasets, which are often difficult to obtain in sufficient quantity and quality. The controller 106 needs only a small amount of real-world data for effective deployment.

Figure 5B:
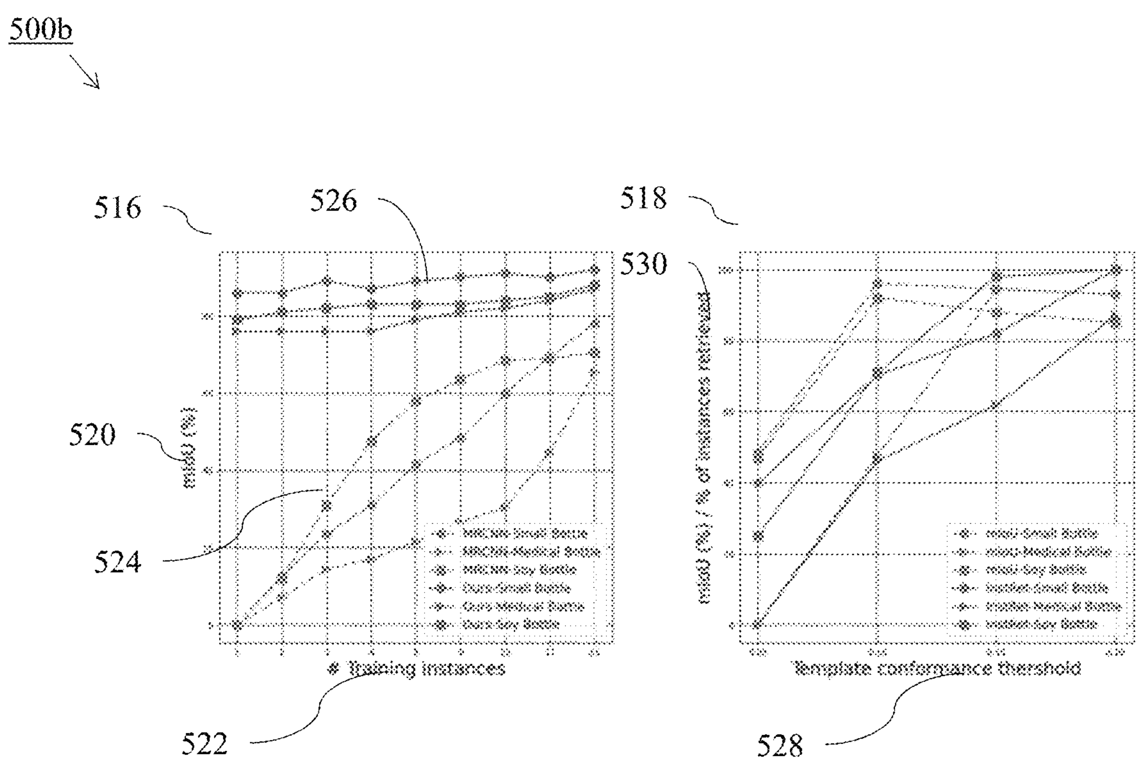
FIG. 5B illustrates a schematic diagram of the results operation of the controller on datasets of different objects for their segmentation, according to an embodiment of the present disclosure.

FIG. 5B illustrates a schematic diagram 500*b* of the results of operation of the controller 106 on datasets of different objects for their segmentation, according to an embodiment of the present disclosure. FIG. 5B is explained in conjunction with elements from FIG. 5A.

The schematic diagram 500*b* includes a graph 516 showing a plot of performance in terms of mIoU 520 of the controller 106 with Mask-RCNN 502 against the number of annotated examples or training instances 522 needed for three object categories. The graph 516 shows a comparison of a conventional Mask-RCNN (FT) performance 524 that uses only the original images and their instance annotations for training (along with standard augmentations) against the Mask-RCNN 502 performance 526. As is clear, while performance 524 of the conventional Mask-RCNN is poor (less than 40%) to at a lower number of available training instances, the performance 526 of the Mask-RCNN 502 included in the controller 106 is nearly 85% accuracy even when only a single instance is annotated.

The graph 518 illustrates a plot of template conformance threshold 528 against mIoU % 530 for the controller 106. In the graph 518 two properties are evaluated: (i) how to select the template conformance threshold ne and ii) what fraction of the ground truth instances are retrieved by the controller 106 for a given threshold. For the latter, the ratio of the number of instances returned by the controller 106 against the total number of instances annotated in the image is outlined. The threshold is changed from 0.05 to 2.0 in increments of 0.05. The same setting is for all three object categories. As expected, the graph 518 shows that when the threshold is low and reasonable, the accuracy of the retrieved instances is high (nearly 95%), but the number of instances retrieved is low (about 50%); increasing the threshold to higher values lead to a slight drop in performance while reaching 100% retrieval accuracy. In an embodiment, the controller 106 uses a threshold value of 0.1 for ne for optimal performance.

In various embodiments, the controller 106 provides a simple, modular, and efficient scheme for transparent object instance segmentation in a few-shot setting. The controller 106 may also be configured to extract segments from the few annotated examples to produce synthetic examples, rendering these instances through alpha compositing. These synthetic samples may be used to effectively train the Mask-RCNN 502 model to achieve high performance.

Figure 6A:
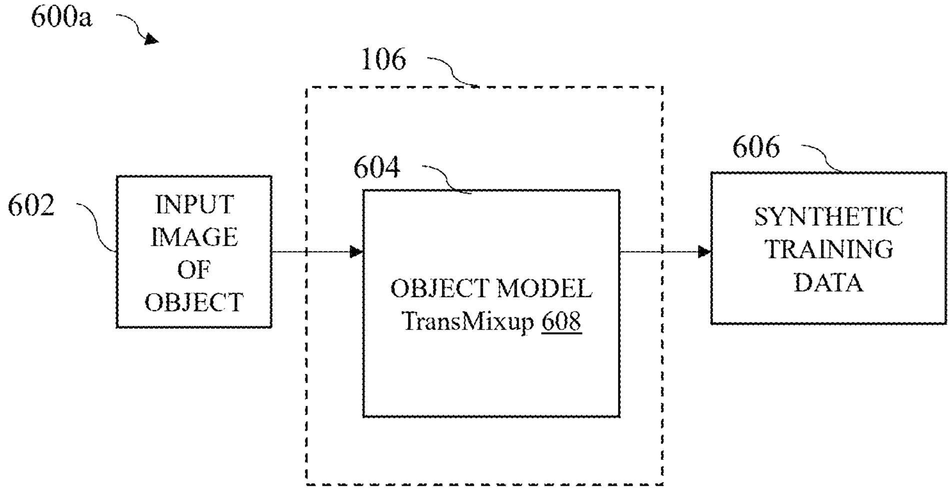
Figure 6B:
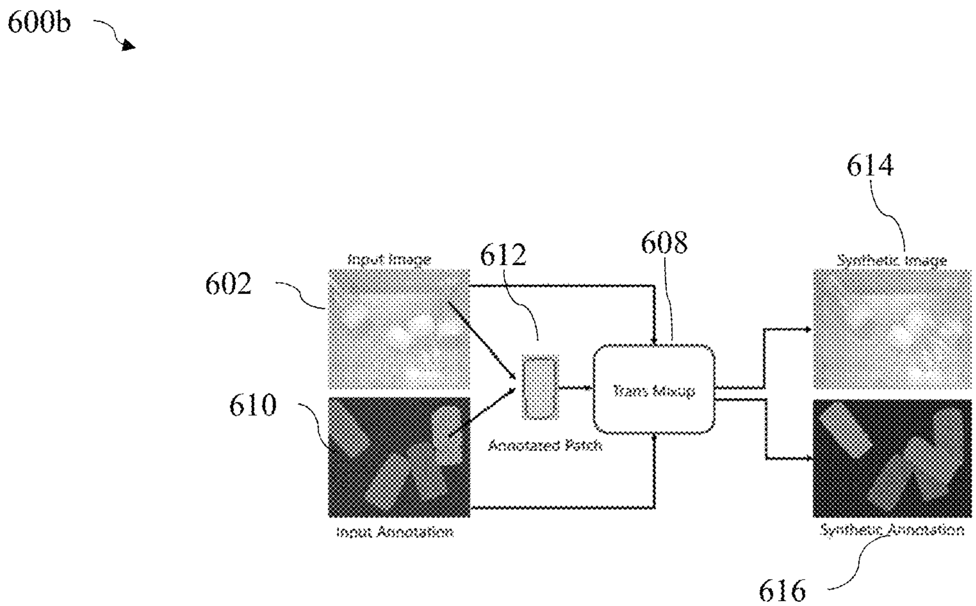

FIG. 6A, FIG. 6B, and FIG. 6C collectively illustrates schematic diagrams showing the generation of synthetic training data by the controller 106, according to an embodiment of the present disclosure.

FIG. 6A illustrates a block diagram 600*a* showing the generation of synthetic training data 606 based on an input image 602, using the controller 106. The controller 106 includes an object model 604 which uses a Transparent Instance Mixup (TransMixup) 608 algorithm to generate the synthetic training data 606.

The object model 604 may comprise computer-executable instructions that may be executed by a processor, such as a processor of the controller 106, to generate the synthetic training data 606. The synthetic training data 606 comprises a plurality of synthetic images that may be used for training the segmentation 112 module. Using the training data 606, the segmentation 112 module is trained to segment the object in the input image 102 to produce the segmented object 122. The object model 604 augments the few-shot training set to use annotated object examples to produce a shape and appearance model of the object (such as the object 104 in the input image 102) using randomly sampled annotated masks and their respective image instance patches, which are then spatially transformed and blended with the input image 602 to produce diverse training images containing an arbitrary number of instances in diverse spatial and overlapping instance configurations.

FIG. 6B illustrates a schematic diagram 600*b* showing the generation of a synthetic image 614 through the use of the TransMixup 608 algorithm, according to an embodiment of the present disclosure.

The input image 602 along with input annotations 610 is used to generate an annotated patch 612. The annotated patch 612, the input image 602, and the input annotations 610 are then applied to the TransMixup 608 algorithm module, which generates the synthetic image 614 and their corresponding synthetic annotation 616.

In an embodiment, $Y \sim \mathcal{Y}$ is a random mask from the set $\mathcal{Y}$ for an image X, and $X_Y = \text{crop}_Y(X[Y])$ denotes the image patch produced after the operations of applying a pixel-wise Hadamard product between X and the mask Y (i.e., $X[Y] = X \odot Y$) followed by an image crop using the bounding box of the instance in the mask Y. Similarly, $Y_Y$ denotes the corresponding instance crop of the mask in Y. A mask Y is selected from $\mathcal{Y}$ if it is isolated (not overlapping with other masks), and thus $X_Y$ captures the appearance of the underlying object $\mathcal{O}$. In an embodiment, the corresponding mask $Y_Y$ of the instance, the crop is a mask for a segmented object. To that end, the mask $Y_Y$ is a ground truth mask associated with the input image X of the object.

To produce augmentations, $\mathcal{T}$ is a set of affine spatial transformations (including spatial rotations, shrinking/skewing, and others) operating on patches. To produce an augmented patch $\tilde{X}$ and its corresponding mask $\tilde{Y}$ a random transformation $t \sim \mathcal{T}$ is selected to produce (shrinking/skewing, and others) operating on patches. To produce an augmented patch $(\widetilde{X}, \tilde{Y}) \leftarrow (t(X_Y), t(Y_Y))$, followed by pasting the image and mask patches at a random spatial location z on a canvas of zeros the size of the image, producing an augmented mask $\tilde{Y} = \text{paste}_z(\tilde{Y}_Y)$ and the respective masked image $\tilde{X} = \text{paste}_z(\tilde{X}_Y)$. To be clear, $\tilde{X}$ and $\tilde{Y}$ are an image and mask pair with the same spatial resolution as the input image but containing only a single augmented instance.

In an embodiment, this transformed patch is the annotated patch 612 which is composed of the original image, the input image 602 to create a new training image, the synthetic image 614. To account for the transparency of the instances, alpha compositing is used which is denoted as blend $(X,\tilde{X},\tilde{Y}|\alpha)$ with a blending parameter $0 \le \alpha \le 1$, updating the input image as:

$$X[\tilde{Y}] \leftarrow (1-\alpha)X[\tilde{Y}] + \alpha\tilde{X}[\tilde{Y}] \quad \text{Eq. (3)}$$

where it is assumed that $X[\tilde{Y}]$ selects image pixels at locations where $\tilde{Y}$ is non-zero. In an embodiment, new instances are always introduced above the previous instances in the depth order, the mask instance identifiers for the new instances supersede those of previous instances, and the masks are blended in the depth order when using it for training the backbone, $M_\theta$. To produce diverse training samples, the TransMixup 608 algorithm is applied recursively on the same image, sampling the augmentation parameters and the object masks.

FIG. 6C illustrates the TransMixup 608 algorithm, according to an embodiment of the present disclosure.

The TransMixup 608 algorithm initializes an augmented dataset $\mathcal{D}'$ to $\mathcal{D}$, at 618, where $$\mathcal{D} = \{(X_i, \mathcal{Y}_i)\}_{i=1}^{n}$$

is the few-shot training set consisting of n pairs of an image and all of its instance annotation masks. Further producing the augmented dataset $\mathcal{D}'$ includes iterative operations such as cropping 620, transformation 622, pasting 624, and blending 626. These operations have been briefly described above. As a result of these operations being done iteratively, at 628, the augmented dataset $\mathcal{D}'$ comprising synthetic training images is produced.

The TransMixup 608 algorithm produces synthetic training samples that look similar to the original images, and the alpha blending step, at 626, produces complex segmentation settings, especially concerning instance overlaps and transparencies. The augmented dataset of synthetic training samples produced by the TransMixup 608 algorithm is used to train the controller 106 to produce high-quality segmented objects for performing the task 110. In an embodiment, such as shown in FIG. 3A, the controller includes the neural network 132, which is trained based on the augmented dataset D' to produce the updated confidence level 128 of the segmented object 122, which may be further used by the object selection 130 module to select a segmented object with the highest confidence level 128, and perform the task 110.

In an embodiment, the controller 106 generates a control signal to control the robot 108 to perform the task 110.

In an embodiment, the robot 108 includes a processor or a processing circuitry that is configured to select the segmented object with the highest confidence score and perform the task 110.

Figure 7A:
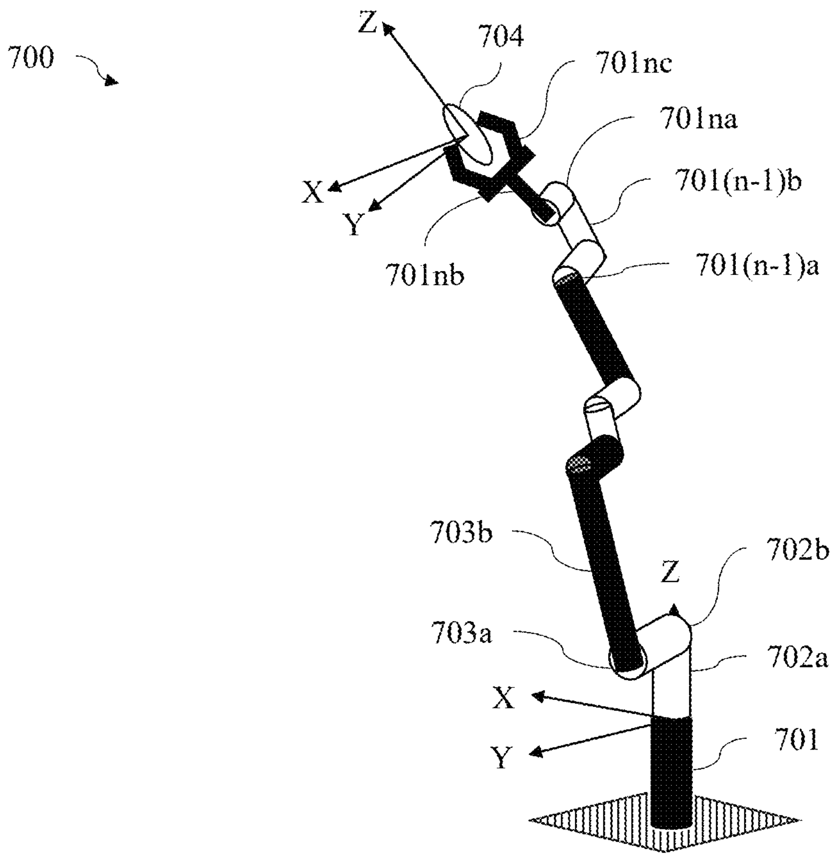
FIG. 7A illustrates a schematic of a robot that may be controlled by the controller to perform the task, in accordance with an example embodiment of the present disclosure.

FIG. 7A illustrates a schematic of a robot 700 that may be controlled by the controller 106 to perform the task 110, in accordance with an example embodiment.

In an embodiment, the robot 700 is a robotic manipulator that is used to perform task 110 corresponding to grasping an object. The robot 700 may be an n degree-of-freedom (DOF) open-chain manipulator. The robot 700 comprises a base 701, multiple joints, multiple links, and an end-effector 701*nc* where each joint may typically move in one or more directions. The robot 700 may be used to perform one or more tasks such as manipulating one or more payloads such as an object 704. The specific task may be defined in terms of parameters including, e.g., an initial position and velocity of the object 704, a final position and velocity of the object 704, acceleration and velocity constraints on the object 704, time to accomplish the task, a start pose of the object 704, a goal pose of the object 704, and the like. The robot 700 may be electronically coupled to a control system such as the controller 106 of FIG. 1, that provides control inputs/commands to execute the task 110. An interface may be utilized to receive or collect one or more tasks. According to some embodiments, the base 701 may be mountable on a surface such as a floor or a movable platform. The other end of the base 701 may be mechanically coupled with a first-axis link 702*b* through a first-axis joint 702*a*. The first-axis link 702*b* is coupled with a second-axis joint 703*a*, which is connected to a second-axis link 703*b*. This coupling and connection patterns are repeated until reaching the end-effector 701*nc*, which is attached to a last-axis link 701*nb*. The last-axis link 701*nb* is coupled with a previous link 701$(n-1)b$ through a last-axis joint 701*na*. According to some embodiments, one or more components of the robot 700 may be modeled in any suitable manner such as in terms of mathematical equations and a corresponding model of the components may be accessible to the control system of the robot 700. Each such model may describe interaction between various variables about the corresponding component such as control input variables, and state variables (for example position, orientation, heading, etc.).

In some embodiments, a joint of the robot 700 may be of any suitable type including but not limited to revolute, prismatic, helical, etc. The movements of the joints of the robot 700 may be controlled by one or more actuators coupled to the joints such that the robot 700 can be moved by one or more control inputs to effectuate manipulation of the payload 704 along any dimension.

The controller 106 may be configured for controlling the robot 700 according to the task 110, in accordance with some example embodiments. The robot 700 may be configured to take observations of an environment in which the robot 700 is operative to perform the task 110. The observations may include data associated with the state of the robot 700. The data may be transformed into embeddings in a latent space, such as by invoking the controller 106 shown in FIG. 1.

The embeddings of the observations may include data of the input image 102 of the object 104, which may be processed by the controller 106 to select an object segment for the robot 700 to perform the task. To that end, the controller generates one or more control commands for the robot 700 to execute an action based on the state information of the robot 700 and the object 104 in the environment. The controller 106 outputs the generated control commands to one or more actuators of the robot 700 to control the robot 700, for example by causing a change in the state of execution of the task 110.

Figure 7B:
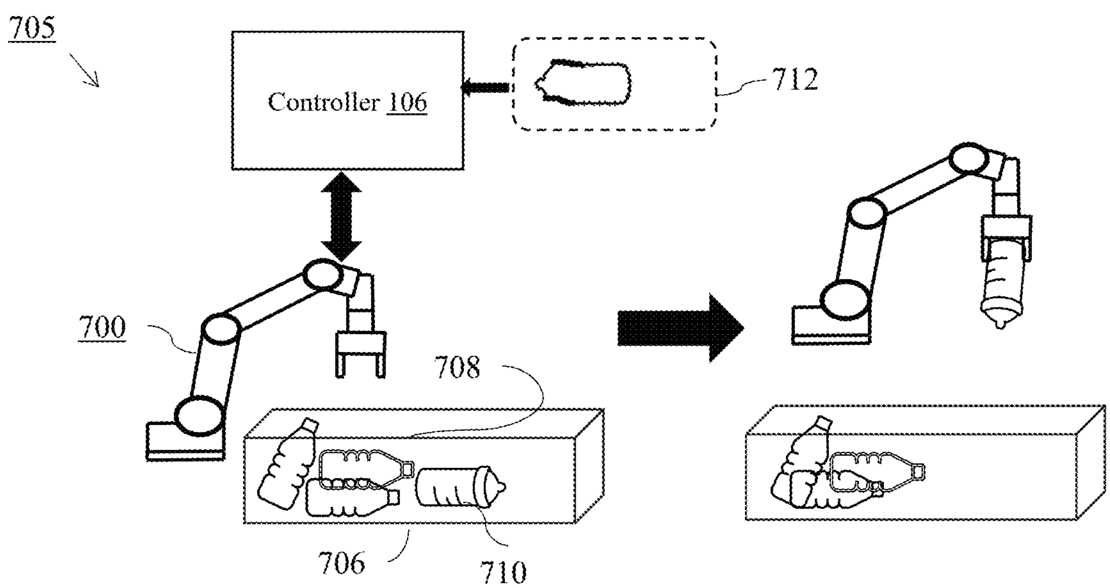
FIG. 7B illustrates a schematic of an example task performed by the robot, according to an embodiment of the present disclosure.

FIG. 7B illustrates a schematic of an example task 705 performed by the robot 700, according to an embodiment of the present disclosure. The task 705 is equivalent to that task 110 shown in FIG. 1 and is for example a bin-picking task. In the task 705, the robot 700 is required to pick a bottle 710 from a bin 706 comprising a set of bottles 706.

In an embodiment, the bin 706 includes or is coupled with a camera facing directly into the bin 706 for capturing an image of the bin 706 and the set of bottles 708 in the bin 706. For example, the set of bottles 708 belongs to different object categories, including, but not limited to a small bottle, a large bottle, a mayo bottle, a pet bottle, a medical bottle, a sauce bottle, and a soy bottle—where all the categories constitute everyday objects. The bottle 710 may be the sauce bottle, that the robot 700 is required to pick.

The robot 700 is coupled to the controller 106 which causes the camera attached to the bin 706 to capture an image of the bin 706. The controller 106 retrieves a template 712 for the sauce bottle, which is the bottle 710 and uses the template to generate a confidence level for each segmented object in the image of the bin 706. For this, the controller compares constrained affine transformations of the template 712 of the sauce bottle with each of the segmented objects and selects a segmented object based on the comparison of the confidence level of the segmented object with a confidence level threshold. The selected segmented object corresponds to the image patch for bottle 710. For this identified segmented object, the controller 106 controls the end effectors of the robot 700 to reach a position and a pose that causes the robot to pick the bottle 710.

Figure 8:
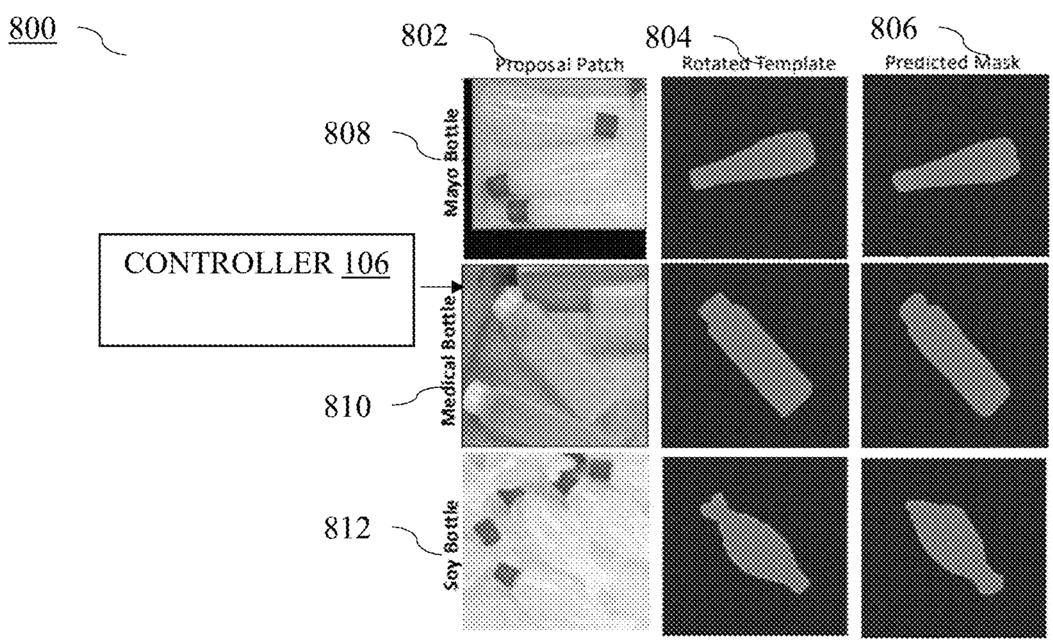
FIG. 8 illustrates a diagram showing the generation, by the controller, of segmented objects for distinct categories or classes of objects, according to an embodiment of the present disclosure.

FIG. 8 illustrates a diagram 800 showing the generation, by the controller 106, of segmented objects for distinct categories or classes of objects, according to an embodiment of the present disclosure.

In FIG. 8, objects of three distinct categories are shown-a mayo bottle 808 category, a medical bottle 810 category, and a soy bottle 812 category. Corresponding to each category, an input image in the form of a proposal patch 802 for each object category, a rotated template 804 for each of the object category is shown, which is used by the controller 106 for generating predicted masks 806, also referred to segmented objects 806 corresponding to each object of each object category.

The rotated template 804 may be generated by the constrained affine transformation generation 116 module shown in FIG. 1 and each rotated template may be transformed using predicted poses by the constrained affine transformation generation 116 module. The constrained affine transformation generation 116 module is required to predict the pose of the instance at the center of the proposed patch 802. The predicted pose is then used to select the correct object of the desired object category and use the selected object in performing a task.

Figure 9:
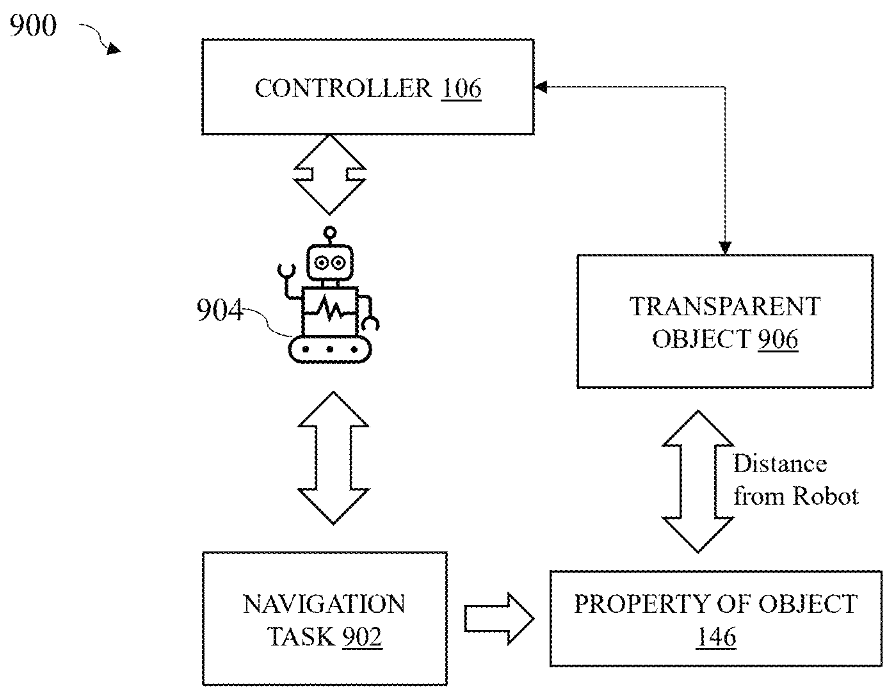
FIG. 9 illustrates an example of a navigation task performed by a robot for navigating in the vicinity of a transparent object, in accordance with an embodiment of the present disclosure.

FIG. 9 illustrates an example of a navigation task 902 performed by a robot 904 for navigating in the vicinity of a transparent object 906, in accordance with an embodiment of the present disclosure.

The robot 904 is in communication with the controller 106 which identifies the transparent object 906 in a path or trajectory of navigation of the robot 904. To that end, the controller 106 identifies the property 146 of the transparent object 906 based on the underlying navigation task 902. In an embodiment, the property 146 of the transparent object 906 is distance from the robot 904 or proximity to the robot 904. This property is transformed into a constraint limiting a size of a template of the target transparent object 906. The constraint may limit the size of the template to be above a predetermined size. The predetermined size may be determined based on the distance of the robot 904 from the transparent object 906 so that the transparent object 906 is still at a safe distance and collision with the transparent object 906 may be avoided. The constraint is then used to identify the type of affine transformation shrinking the size of the transparent object 906. Using this affine transformation of the template of the transparent object 906, this object may be identified in the presence of other objects also in the path of navigation of the robot 904, and the navigation task 902 of the robot 904 may be performed based on detecting and avoiding collision with the transparent object 906 while navigating in the proximity of the transparent object 906.

Figure 10:
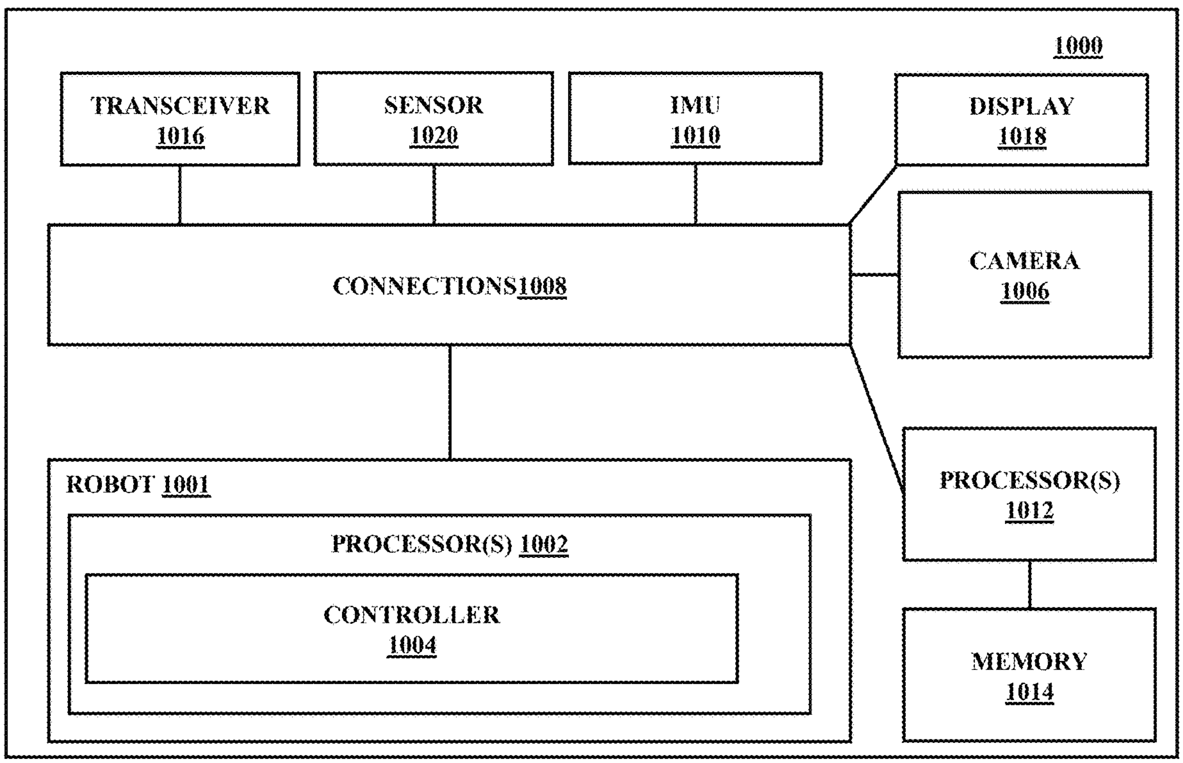
FIG. 10 illustrates some components of a control system for controlling a robot according to a task, according to some embodiments of the present disclosure.

FIG. 10 illustrates some components of a control system 1000 for controlling a robot 1001 according to a task, according to some embodiments. The control system 1000 comprises communication interfaces such as a transceiver 1016, sensors 1020, input interfaces such as an inertial measurement unit (IMU) 1010, output interfaces such as a display 1018, one or more visual sensors such as a camera 1006, computational circuitry realized through one or more processors 1012 and memory 1014. One or more connection buses 1008 may couple the components of the control system 1000 with each other. According to some embodiments, the control system 1000 may also be coupled with the robot 1001. The robot 1001 comprises suitable processing circuitry realized through processors 1002 and memory that stores a controller 1004. The controller 1004 is equivalent to the controller 106 described in conjunction with various embodiments disclosed above.

According to some embodiments, the modules described regarding FIG. 1 to FIG. 9 may be executed by the processing/computation circuitry of the control system 1000 to cause object segmentation in accordance with various embodiments described herein.

Figure 11:
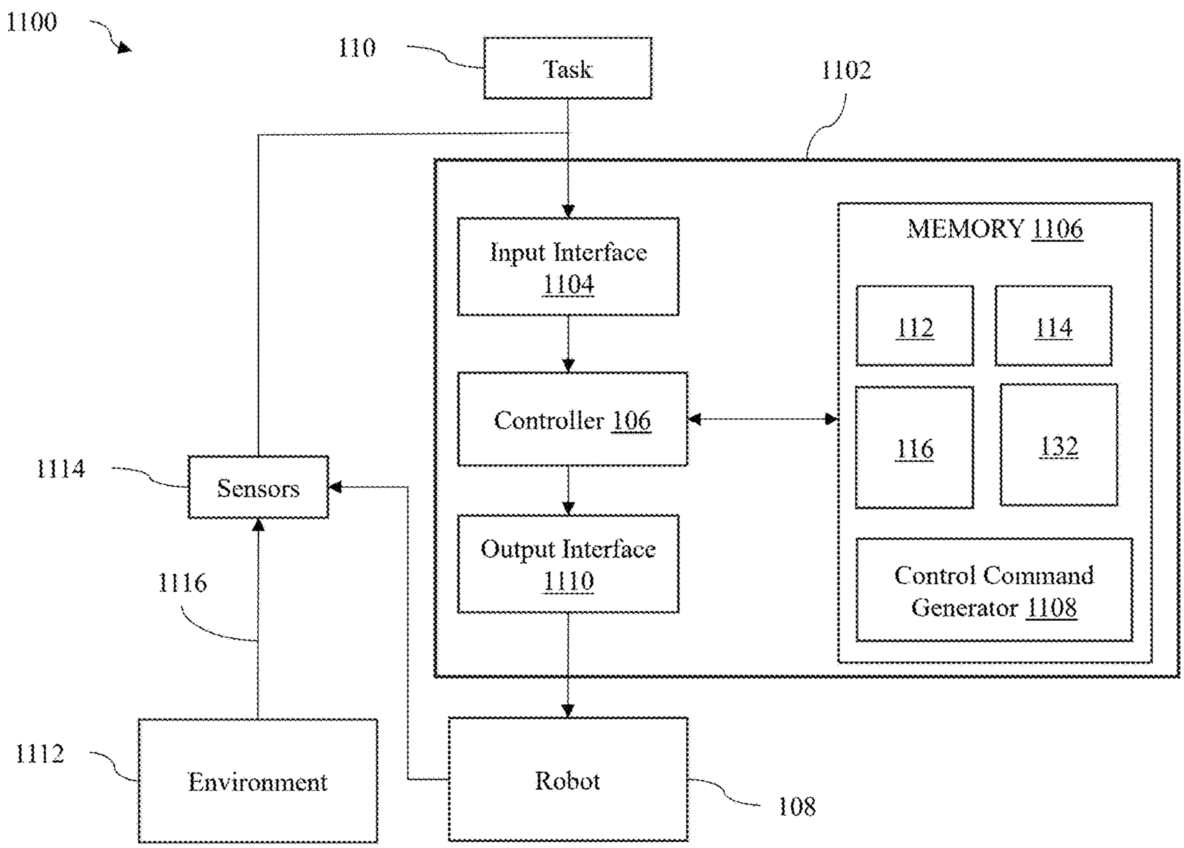
FIG. 11 illustrates an example detailed block diagram of a system including the controller, in accordance with an embodiment of the present disclosure.

FIG. 11 illustrates an example detailed block diagram of a system 1100 including the controller 106, in accordance with an embodiment of the present disclosure. The controller 106 processes input data received via an input interface 1104 by invoking various modules stored in a memory 1106. The modules include, for example, the segmentation 112 module, the confidence level update 114 module, the constrained affine transformation generation 118 module, and the neural network 132, which are shown in different embodiments described above. It may be understood that the representation of modules in FIG. 11 is for example only, and not to be construed as limiting. Any number of modules may be added, removed, or modified, without deviating from the scope of the present disclosure.

According to some embodiments, the task 110 may be an object assembling task such as furniture assembly and may be subdivided into a plurality of sub-tasks, each achievable or realizable through a series of actions. In another embodiment, the task 110 may be an object-picking task which is a sub-task of another task, such as a factory automation task, a cooking task, a medical task, and the like. According to some embodiments, task modeling considers each task as a combination of hierarchical skills and actions of those skills. The task 110 may be received (accepted) by the system 1100 via the input interface 1104. The system 1100 further includes an output interface 1110 through which one or more control commands may be sent to the robot 108 to control the robot 108 to cause execution of actions required for performing the task 110. The controller 106 processes, using a circuitry, the input data received via the input interface 1104 by invoking various modules stored in the memory 1106.

According to some embodiments, the system 1100 includes sensors 1114 for capturing observations 1116 for the robot 108 and/or its environment 1112. For example, the robot 108 may include a robotic manipulator and the environment 1112 is an assembly environment, so the observations may comprise multi-modal observations about the robotic manipulator and/or the assembly environment. According to some embodiments, the multi-modal observations include tactile, visual, and proprioceptive observations of the robotic manipulator and the assembly environment. For example, the multi-modal observations include measurements of one or more visuotactile sensors attached to the end effector of the robotic manipulator for tracking the motion of markers on the sensor, video frames of a camera observing the state of execution of the task 110 for a pose estimation of an object, and proprioceptive measurements of one or more actuators of the robotic manipulator.

In some embodiments, the system 1100 operates in a feedback loop to generate a hierarchical output with output actions conditioned upon skills required to perform the task 110. That is, at each instance of time, the input observations are processed to predict an action conditioned upon the skill of the robotic manipulator. The action is translated into one or more control commands by a 1108 control command generator and transmitted to the robotic manipulator via the output interface 1110 to perform contact-rich manipulation with real-world objects to execute the assembly task. Each skill defines a combination of actions for the robotic manipulator. Upon execution of the commands, the state of the robotic manipulator and the objects in the assembly environment changes. Accordingly, the sensors 1114 recapture the observations 1116 and the processing is repeated until all the sub-tasks of the assembly task are executed. Thus, the input bundle is used to predict the target pose as the action for a current timestep. At each step, the inputs are aggregated to predict the state at the current timestep.

In some embodiments, the memory 1106 may be configured to store a tokenizer module that encodes each of the observations 1116 into an embedding of that observation in a latent space. For example, the tokenizer generates a proprioception embedding input, a visual signal embedding input, a contact information embedding input, a demonstrated action embedding input, and the like from the observations 1116.

In some embodiments, the memory 116 stores the neural network 132 which generates an updated confidence level for a segmented object to cause the selection of a segmented object with the highest confidence level for performing the task 110.

Various embodiments described above provide systems, methods, and the controller 106 for implementing a simple, modular, and efficient scheme for object instance segmentation, specifically for transparent objects. The various embodiments disclosed herein may be implemented in a few-shot setting making the overall task performance using the robot 108 and the controller 106, highly efficient, computationally feasible, and accurate. As described in various embodiments, the controller 106 causes the extraction of various segments from the few annotated examples to produce synthetic examples, rendering these instances through alpha compositing. The controller 106 may also be used to effectively train a Mask-RCNN model to achieve high performance. Further, the controller 106 also implements various methods for filtering the masks produced by the Mask-RCNN for better prediction, higher accuracy, and more conformance with a template object.

The above description provides exemplary embodiments only and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as outlined in the appended claims.

Specific details are given in the above description to provide a thorough understanding of the embodiments. However, understood by one of the ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware, or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of several suitable programming languages and/or programming or scripting tools and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described concerning certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A robot for performing a task, comprising a processor causing the robot to:

segment an object in an input image to produce a segmented object and a confidence level of segmentation;

update the confidence level of segmentation, to generate an updated confidence level, by comparing the segmented object with constrained affined transformations of a template of the object, wherein a constraint limiting the affined transformations is indicative of a property of the object, wherein the property of the object is selected based on the task to be performed and limits a space of affine transformations considered during updating of the confidence level; and perform the task based on the segmented object and the updated confidence level of the segmented object.

2. The robot of claim 1, wherein the property of the object includes one or a combination of a non-occlusion of the object by other objects, a pose of the object, and a distance of the robot from the object.

3. The robot of claim 2, wherein the property of the object is the non-occlusion of the object by other objects, and the template of the object includes only an image of a non-occluded object.

4. The robot of claim 2, wherein the property of the object is the pose of the object, and the constrained affine transformations are limited to transforming the template of the object into desired poses.

5. The robot of claim 2, wherein the property of the object is the distance of the robot from the object, and the constrained affine transformations are limited to preserving the template of the object above a predetermined size.

6. The robot of claim 1, wherein to perform the task based on the segmented object, the processor causes the robot to:

compare the updated confidence level of the segmented object with a confidence level threshold; and perform the task based on the comparison.

7. The robot of claim 6, wherein the processor causes the robot to perform the task based on the comparison is indicative of a determination that the updated confidence level of segmentation is greater than or equal to the confidence level threshold.

8. The robot of claim 6, wherein the processor causes the robot to select a next segmented object based on the comparison is indicative of a determination that the updated confidence level of segmentation is lesser than the confidence level threshold.

9. The robot of claim 1, wherein the processor causes the robot to execute a trained neural network to update the confidence level of the segmented object based on the segmented object and the constrained affine transformations of the template of the object.

10. The robot of claim 1, wherein the segmented object is transmitted to an object model for generating a plurality of synthetic images for training a segmentation model, such that the segmentation model is used to segment the object in the input image to produce the segmented object.

11. The robot of claim 10, wherein the plurality of synthetic images are generated based on a set of affine transformations of: the segmented object and a corresponding mask of the segmented object.

12. The robot of claim 10, wherein the plurality of synthetic images are generated based on recursively applying each affine transformation from the set of affine transformations, on the segmented object and the corresponding mask of the segmented object.

13. A controller for controlling a robot for performing a task, the controller comprising:

a memory to store instructions; and a processor configured to execute the instructions to cause the controller to perform operations, the operations comprising:

segmenting an object in an input image, wherein the input image is indicative of an environment associated with the task;

updating a confidence level of segmentation by comparing the segmented object with constrained affined transformations of a template of the object with constraints indicative of a property of the object, wherein the property of the object is selected based on the task to be performed and limits a space of affine transformations considered during updating of the confidence level; and performing the task using the property of the object based on the updated confidence level of the segmented object.

14. The controller of claim 13, wherein the property of the object includes one or a combination of a non-occlusion of the object by other objects, a pose of the object, and a distance of the robot from the object.

15. The controller of claim 14, wherein the property of the object is the non-occlusion of the object by other objects, and the template of the object includes only an image of a non-concluded object.

16. The controller of claim 13, wherein performing the task using the property of the object based on the updated confidence level of the segmented object comprises:

comparing the updated confidence level of the segmented object with a confidence level threshold; and performing the task based on the comparison.

17. The controller of claim 16, wherein for performing the task based on the comparison, the processor is configured for:

determining that the updated confidence level of the segmented object is greater than or equal to the confidence level threshold.

18. A non-transitory computer-readable medium having stored thereon instructions that when executed by a computer, cause the computer to perform a method for controlling a robot for performing a task, the method comprising:

segmenting an object in an input image;

updating a confidence level of segmentation by comparing the segmented object with constrained affined transformations of a template of the object with constraints indicative of a property of the object, wherein the property of the object is selected based on the task to be performed and limits a space of affine transformations considered during updating of the confidence level; and performing the task using the property of the object based on the updated confidence level of the segmented object.

19. The non-transitory computer-readable medium of claim 18, wherein the method further comprising:

comparing the updated confidence level of the segmented object with a confidence level threshold such that the confidence level threshold is set according to the task; and performing the task based on the comparison.

20. The non-transitory computer-readable medium of claim 18, wherein the constrained affine transformations exclude transformations inconsistent with the property of the object used for performing the task.

* * * * *